Oct. 18, 1938.   W. J. ANDRES ET AL   2,133,275
CONTROL MECHANISM
Filed Jan. 3, 1936
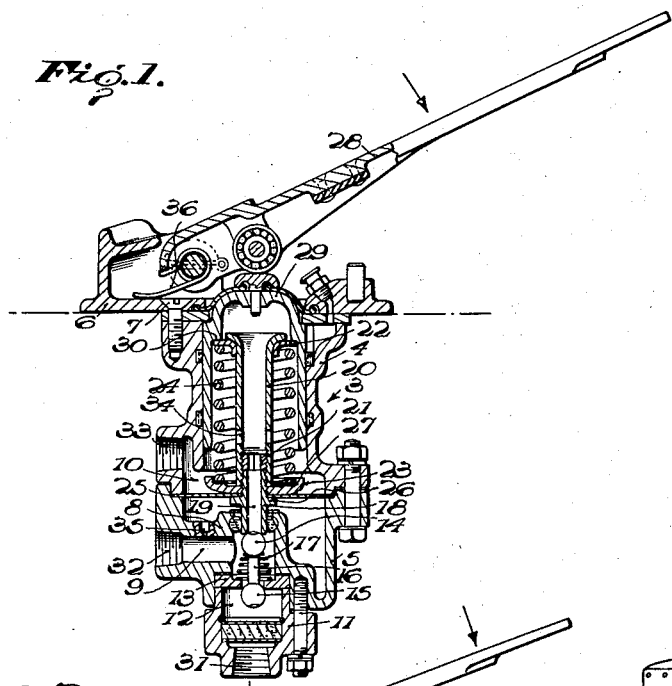
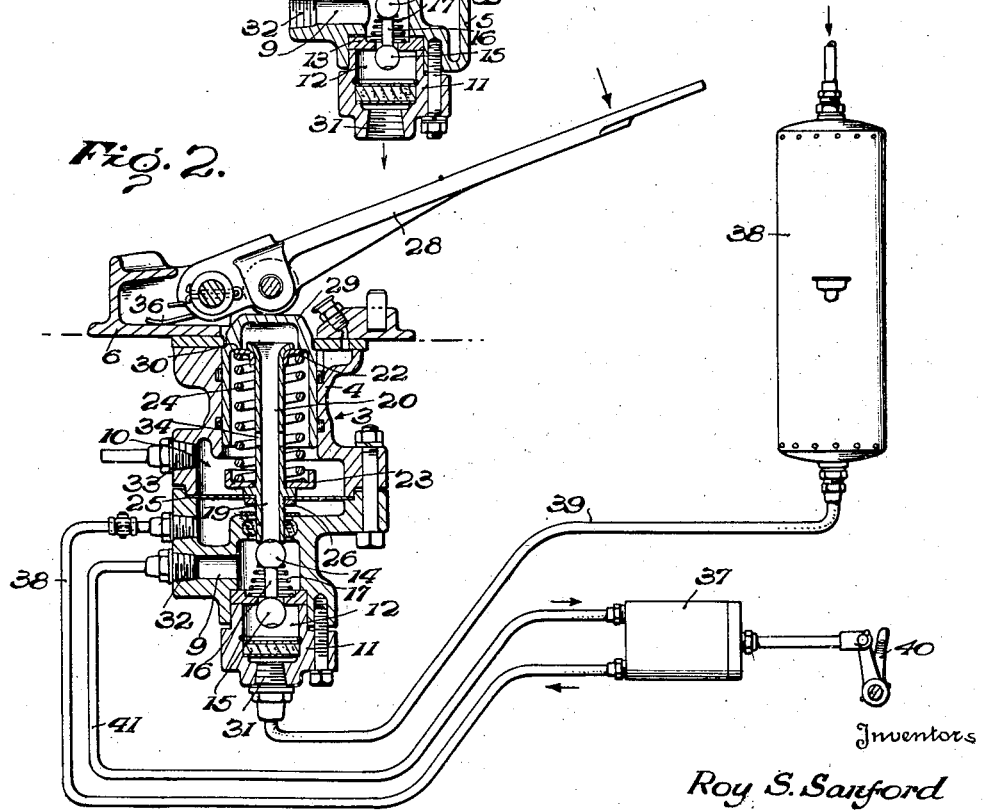
Inventors
Roy S. Sanford
William J. Andres
By
Attorney Patented Oct. 18, 1938

2,133,275

UNITED STATES PATENT OFFICE 2,133,275

CONTROL MECHANISM

William J. Andres, Pittsburgh, Pa., and Roy S. Sanford, New York, N. Y., assignors to Bendix-Westinghouse Automotive Air Brake Company, Pittsburgh, Pa., a corporation of Delaware Application January 3, 1936, Serial No. 57,411

12 Claims. (Cl. 303—54)

This invention relates to control mechanisms and more particularly to remotely-controlled fluid pressure-operated mechanisms especially adaptable for use in connection with motor vehicles.

It has heretofore been proposed to employ power-operated remotely-controlled mechanisms for operating various of the control elements of automotive vehicles and apparatus of this character is especially suitable and adaptable for motor vehicles of the type wherein the engine and transmission device are positioned at the rear of the vehicle. Remotely-controlled power mechanisms of the above character may be operated by any convenient source of power such as electrical means or fluid pressure means, and the present invention is primarily directed to apparatus of this type employing fluid pressure means for effecting power operation thereof.

In general terms, the object of the present invention is to provide a novel mechanism for the remote controlling of vehicle control members through the use of a fluid pressure actuator, which may be actuated by air under pressure or by vacuum.

More particularly, the invention contemplates the utilization of a novel remotely-positioned valvular means which is preferably of the self-lapping type and which embodies a construction permitting a more rapid build-up of pressure within the remotely-controlled actuator than that which has heretofore been obtainable with this type of valve. In one form of the invention, the fluid for effecting the lapping of the valvular mechanism is returned from the fluid pressure actuator, while in another form, the application of fluid pressure to the lapping mechanism is obtained directly at the valve but is delivered through a restricted connection. With either form, the rapidity of the response of the actutaor upon operation of the valvular means is materially greater than that which has been heretofore obtained in installations where the actuator is located remotely with relation to the controlling valve.

The present invention, in addition to the above, furthermore provides a novel valvular apparatus comprising relatively few parts which may be readily assembled with a minimum number of operations and one which is so constituted as to insure long life and which is moreover economical of manufacture.

In order that those skilled in the art may more fully understand the nature of the present invention and its application to vehicle-controlling members, two modifications have been set forth hereinafter by way of description and exemplification in the accompanying drawing. It is to be expressly understood, however, that the drawing is employed for purposes of illustration only and is not designed as a definition of the limits of the invention, reference being had for this purpose to the appended claims.

In the drawing, wherein similar reference characters refer to similar parts throughout the several views:

Fig. 1 is an axial sectional view of one form of valvular mechanism constructed in accordance with the principles of the present invention, and Fig. 2 is an axial sectional view of another form of valvular mechanism which may be employed and which is illustrated in connection with a fluid pressure system for operating a vehicle-controlling element.

Referring more particularly to Fig. 1, the invention is disclosed therein as embodying a self-lapping valvular mechanism including a casing 3 formed of upper and lower sections 4 and 5 respectively. The casing may be secured to a support 6 in any suitable manner as by a screw 7 for ready accessibility by a vehicle operator. As shown, the casing is divided into a plurality of chambers, a partition 8 being provided and forming with said casing an outlet chamber 9 and an exhaust chamber 10. The lower casing section 5 is so formed as to receive an inlet coupling member 11 forming with said casing section 5, an intake chamber 12, an intake valve seat member 13 being securely maintained in the position shown by the coupling member 11.

Valve means are provided for controlling the flow of fluid pressure from the intake chamber 12 to the outlet chamber 9 and from the latter to the exhaust chamber 10, and in accordance with one of the features of the present invention, such valve mechanism is so constituted as to be self-aligning and to offer substantially unimpeded flow of fluid past the intake valve portion thereof. As illustrated, such means are constituted by exhaust and intake valves 14 and 15 respectively, said valves being of spherical form and rigidly connected as by means of a rod 16. A single spring 17 seated upon the intake valve seat member 13 is employed as the sole support for the valves 14, 15 and, as shown, normally tends to urge the valves upwardly in order to effect a closure of the intake valve. It will be perceived that with a valve constructed as above described, an exceedingly simple structure is provided and one wherein tight closure of the intake valve will be insured irrespective of lateral misalignment of the valve. The construction also avoids the use of complicated guide structures for the intake valve which would otherwise impede the flow of pressure fluid to the outlet chamber.

In order to actuate the valves 14 and 15, in order to control the flow of fluid pressure to the outlet chamber and also to control the communication between the outlet chamber and the exhaust chamber, a valve-actuating plunger 18 is utilized which is provided with an axial bore 19 forming an exhaust passage. This plunger is threadedly received by the lower end of a tubular member 20, an apertured locking member 21 being utilized interiorly of the member 20 for locking the plunger 18 in position. The upper end of the member 20 is flanged outwardly and supports a seat 22, a second seat 23 being positioned at the lower end of the member 20. A precompressed graduating spring 24 is confined between said seats and, in assembling, is placed under a slight degree of initial compression for a purpose which will appear more fully hereinafter.

Secured to the valve plunger 18 is a pressure-responsive element constituted by a diaphragm 25, clamped between the two casing portions 4 and 5 and isolating the exhaust chamber 10 from the partition 8. This diaphragm is securely maintained in position upon the plunger 18 as by being interposed between seat 23 and an annular shoulder 26 formed on the plunger. In assembling the plunger 18, member 20 and diaphragm 25 in connection with the spring 24, one or more shims 27 may be utilized between the lower end of the spring 24 and the seat 23 in order to impart the desired degree of precompression to the spring 24.

Manually-operable means are provided for operating the plunger 18 and in the form shown are constituted by any suitable type of pedal 28 which is adapted to depress a cup-shaped actuator 29 slidably received within the casing section 4 and formed with a shoulder 30 in constant engagement with seat 22.

In utilizing the valve structure heretofore described for the remote operation of vehicle-controlling elements, it will be readily understood that the coupling 11 is connected through an opening 31 to a suitable reservoir of motive fluid, outlet chamber 9 is connected through opening 32 to a fluid pressure actuator connected to the vehicle-controlling element, while exhaust chamber 10 is connected directly to atmosphere through opening 33. The exhaust chamber 10 is, moreover, in constant communication with the bore 19 of the plunger 18 through ports 34 formed in the side wall of the member 20.

In operation and considering the parts are so adjusted that the intake valve 15 is closed and the plunger 18 is spaced slightly above the exhaust valve 14, depression of pedal 28 will through actuator 29 move the entire assembly constituted by spring 24, member 20 and plunger 18 downwardly, whereby the exhaust valve 14 will be closed and the intake valve 15 opened. Fluid pressure will thereupon be conducted directly to the outlet chamber 9 and from thence to the fluid pressure actuator, not shown. In self-lapping valves heretofore utilized, the pressure-responsive elements thereof which effect a lapping of the valve mechanism have been freely open to the outlet chamber and hence as soon as the pressure builds up in said outlet chamber, the pressure exerted against the pressure-responsive element tends to move the same in opposition to the initial opening force to close the intake valve. With such an arrangement, the intake valve opening is thus gradually decreased at a time when it is desired to build up the pressure within the outlet chamber and the power actuator supplied therefrom as rapidly as possible. This gives rise to a gradual tapering off of the pressure build-up within the power actuator so that the proper operation of the latter is somewhat delayed.

With the present invention, it is desired to particularly point out that upon opening of the intake valve 15 and supplying of the fluid pressure to the chamber 9, the application of said pressure to the pressure-responsive element 25 is retarded or choked as by means of a restrictive choke 35. With such an arrangement, the rate of pressure build-up within the actuator supplied from chamber 9 will be materially greater than the rate of pressure build-up beneath the element 25, and the tapering-off action above referred to will be materially reduced. Thus, notwithstanding the remote position of the fluid pressure actuator, the same will be promptly actuated before the pressure beneath element 25 reaches a value sufficient to cause any appreciable lapping movement of the valvular mechanism. This action will be reversed when the valve is moved to exhaust position, that is the exhausting phase will take place rapidly. The element controlled by the power actuator may thus be promptly actuated in either direction.

It will be understood that after the first initial movement of the pedal 28, assuming that the same remains in said position, sufficient pressure must be built up beneath element 25 in order to overcome the precompression force existing in spring 24 before the element 25 can effect upward movement of the plunger 18 in order to permit closing of the intake valve 15. Thus, with a slight initial pressure upon the pedal 28, a substantial pressure may be promptly built up within the actuator connected with chamber 9 before the valve mechanism laps. Preferably, this initial increment of pressure supplied by the valvular mechanism is such as to overcome the starting friction and any biasing forces residing in the actuator and the vehicle-controlling elements connected thereto. In order to secure this desirable result, the spring 24 is initially precompressed to such a value that the initial operation of the valvular mechanism will yield this pressure.

In certain instances, as where it is desirable to automatically control the exhaust of fluid pressure from the actuator, it is desirable to restrict the exhaust of fluid from the chamber 9. This is effected in a novel and simple manner by the present invention by providing a spring 36 associated with the pedal 28 and initially tensioned in such a manner as to cause said pedal to exert, when in normal retracted position, a force on the actuator 29 sufficient to move the plunger 18 into engagement with the exhaust valve 14. In certain other cases, as for example when the valvular mechanism is utilized in connection with a gear-shifting device such as that disclosed in the application of Roy S. Sanford, Serial No. 57,410, filed January 3, 1936, it is desirable to maintain a slight pressure within the actuator at all times when the latter is in inactive position, the resulting pressure built up in chamber 9 and beneath element 25 serving to immediately lap the intake valve. This is readily accomplished by adjusting the tension of spring 36 so that the intake valve 15 will initially open to admit said slight pressure to the outlet chamber and actuator prior to lapping.

In the form of the invention illustrated in Fig. 2, the valvular mechanism is similar in structure to that disclosed in Fig. 1 with the exception that instead of pressure-responsive element 25 being subjected to fluid pressure directly from chamber 9 through a restricted opening, the said element is subjected to fluid pressure within the actuator 37 by means of conduit 39. With such an arrangement, it will be readily perceived that the lapping action of the valvular mechanism is materially delayed, thus insuring a rapid build-up of pressure within the actuator. In this figure, the intake chamber 12 is supplied with fluid pressure from a reservoir 38 through a conduit 29, and pressure being supplied to the actuator through conduit 40 upon operation of valve 15. Any suitable vehicle-controlling element, such as a clutch member 40, is connected to the actuator 37 to be operated thereby.

While the invention has been illustrated and described herein with considerable particularity it is to be understood that the same is not limited to the forms shown but may receive a variety of mechanical expressions as will readily appear to those skilled in the art. Reference will, therefore, be had to the appended claims for a definition of the limits of the invention.

What is claimed is:

1. In combination, a fluid pressure actuator, self-lapping valve means for controlling the flow of fluid pressure to said actuator, means including a pressure-responsive member for lapping said valve means when the pressure in said actuator reaches a predetermined value, and means for insuring a rapid build-up of pressure in said actuator upon operation of said valve means to a predetermined degree, said last named means including means for serially conducting fluid pressure from said valve means to said actuator and pressure-responsive member.

2. In combination, a fluid pressure actuator, and means for conducting fluid pressure to said actuator comprising self-lapping valve means having an outlet chamber connected with the actuator, an exhaust chamber, rigidly interconnected inlet and exhaust valves for controlling the flow of fluid pressure to said outlet chamber and from the latter to the exhaust chamber, means including a pressure-responsive element for opening said inlet valve, and means for conducting fluid pressure from said outlet chamber to said element whereby the latter is moved to close said intake valve and lap the valve means, said conducting means including a separate restricted connection insuring that the rate of build-up of pressure against said element will be lower than that in said actuator.

3. Fluid pressure control valve mechanism comprising a casing, a partition therein formed with an intake valve seat, said partition dividing the casing into intake and outlet chambers, a spherical exhaust valve in the outlet chamber, a spherical intake valve in the intake chamber, means rigidly interconnecting said valves, means constituting the sole support and guide for said valves comprising a spring in said outlet chamber contacting said exhaust valve and being seated against the partition, said spring normally maintaining said intake valve in contact with said intake valve seat to close off communication between said chambers, a valve-actuating member formed with an exhaust passage, and means for moving said member into contact with said exhaust valve to move the latter to open the intake valve through said interconnecting means.

4. In combination with a fluid motor, means including a remotely-positioned, operator-controlled, self-lapping valvular mechanism for controlling the flow of fluid pressure to said motor, said mechanism including interconnected exhaust and intake valves, an actuating assembly for operating said valves including a pressure-responsive device, a graduating spring carried thereby and means for initially precompressing said spring, a manually-operable pedal for moving said assembly to operate the valves, and resiliently-acting means associated with said pedal for normally biasing the pedal and assembly to such a position that the exhaust valve is closed.

5. In combination with a fluid motor, means including a remotely-positioned, operator-controlled, self-lapping valvular mechanism for controlling the flow of fluid pressure to said motor, said mechanism including rigidly interconnected exhaust and intake valves, an outlet chamber for conducting the flow of fluid pressure past said valves to and from the fluid motor, means including a pressure-responsive element for operating said valves, a partition for separating said pressure-responsive element from said outlet chamber, a manually-operable element, a graduating spring interposed between said elements, and means for insuring a rapid build-up of pressure in said motor comprising means for restricting communication between the outlet chamber and the pressure-responsive element through the partition whereby lapping of the valvular mechanism will be delayed until the pressure in the fluid motor corresponds substantially to the pressure for which the valvular mechanism has been set by the operation of the manually operable element.

6. Fluid pressure control valve mechanism comprising a casing, a partition therein formed with an intake valve seat, said partition dividing the casing into intake and outlet chambers, a spherical exhaust valve in the outlet chamber, a spherical intake valve in the intake chamber, means rigidly interconnecting said valves, means constituting the sole support for said valves comprising a spring contacting said exhaust valve and being seated against the partition, said spring normally maintaining said intake valve in contact with said intake valve seat to close off communication between said chambers, a valve-actuating member formed with an exhaust passage, a pressure-responsive element carried by said valve-actuating member, a precompressed resilient means interposed between said last named member and element, and means connected with said resilient means for manually moving said pressure-responsive element and valve-actuating member through said resilient means.

7. Fluid pressure control valve mechanism comprising a casing, a partition therein formed with an intake valve seat, said partition dividing the casing into intake and outlet chambers, a spherical exhaust valve in the outlet chamber, a spherical intake valve in the intake chamber, means rigidly interconnecting said valves, means constituting the sole support for said valves comprising a spring contacting said exhaust valve and being seated against the partition, said spring normally maintaining said intake valve in contact with said intake valve seat to close off communication between said chambers, a valve-actuating member formed with an exhaust passage, a pressure-responsive element carried by said valve-actuating member, a pre-compressed resilient means interposed between said last named member and element, means connected with said resilient means for manually moving said pressure-responsive element and valve-actuating member through said resilient means, and means for conducting fluid pressure from said outlet chamber to said element whereby the latter is moved to close said intake valve against the action of said resilient means, said conducting means including a restricted connection.

8. In combination with a fluid motor, means including a remotely-positioned self-lapping valvular mechanism for controlling the flow of fluid to and from the motor, said mechanism including exhaust and intake valves, an actuating assembly for said valves including a pressure-responsive member and a graduating spring, a manually-operable member associated therewith, and a second spring acting on the manually-operable member whereby said actuating assembly is normally biased to such a position that the exhaust valve is closed.

9. In combination with a fluid pressure actuator, self-lapping valve means for controlling the flow of fluid pressure to said actuator, means including a pressure-responsive member and a pre-compressed spring associated therewith for lapping said valve means when the pressure in said actuator reaches a predetermined value, manually-operable means for further compressing said spring, and means including a second spring adapted to exert and transmit a force through the said valve-lapping means whereby the exhaust of said valve means will normally be closed.

10. Fluid pressure control valve mechanism comprising a casing, a partition therein dividing the casing into intake and outlet chambers and having an intake valve seat formed thereon in said intake chamber, a movable valve operating member having an exhaust port and an exhaust valve seat formed thereon substantially in alignment with said intake valve seat, a spherical intake valve in the intake valve chamber, a spherical exhaust valve in said outlet chamber, means rigidly interconnecting said valves, and a spring interposed between said partition and exhaust valve in said outlet chamber for urging said intake valve toward its seat and for resiliently maintaining both of said valves substantially in alignment with their respective seats, said spring and seats forming the sole guiding means for said valves.

11. Fluid pressure control valve mechanism comprising a casing, a partition therein formed with an intake valve seat, said partition dividing the casing into intake and outlet chambers, a second partition in said casing, a spherical exhaust valve in the outlet chamber, a spherical intake valve in the intake chamber, means interconnecting said valves, means constituting the sole support and guide for said valves comprising a spring in said outlet chamber contacting said exhaust valve and being seated against the first partition, said spring normally maintaining the intake valve in contact with the intake valve seat to close off communication between said chambers, a valve-actuating member passing through said second partition and formed with an exhaust passage, and means for moving said member into contact with said exhaust valve to move the latter to open the intake valve through said interconnecting means.

12. Fluid pressure control valve mechanism comprising a casing, a partition therein formed with an intake valve seat, said partition dividing the casing into intake and outlet chambers, a second partition in said casing, a spherical exhaust valve in the outlet chamber, a spherical intake valve in the intake chamber, means interconnecting said valves, means constituting the sole support and guide for said valves comprising a spring in said outlet chamber contacting said exhaust valve and being seated against the first partition, said spring normally maintaining the intake valve in contact with the intake valve seat to close off communication between said chambers, a valve-actuating member passing through said second partition and formed with an exhaust passage, a diaphragm mounted in said casing above said second partition, the second partition and diaphragm defining a diaphragm chamber, means connecting said diaphragm and valve-actuating member, and means for connecting said outlet and diaphragm chambers through the second partition.

WILLIAM J. ANDRES.
ROY S. SANFORD.